United States Patent [19]

Kelley, Jr. et al.

[11] 3,963,978

[45] June 15, 1976

[54] REACTIVE POWER COMPENSATOR

[75] Inventors: Fred W. Kelley, Jr., Media; Charles H. Titus, Newtown Square, both of Pa.

[73] Assignee: General Electric Company, Philadelphia, Pa.

[22] Filed: Feb. 14, 1975

[21] Appl. No.: 550,090

[52] U.S. Cl. .................................. 323/102; 13/12; 323/109; 323/119
[51] Int. Cl.² .......................................... H02J 3/18
[58] Field of Search ................ 13/12; 323/6, 8, 101, 323/102, 105, 106, 108, 109, 110, 119, 120, 121, 122, 124, 126–128

[56] References Cited
UNITED STATES PATENTS

| | | | |
|---|---|---|---|
| 3,422,343 | 1/1969 | Specht et al. .................... | 323/121 X |
| 3,740,638 | 6/1973 | Thorborg ........................ | 323/119 X |

FOREIGN PATENTS OR APPLICATIONS

| | | | |
|---|---|---|---|
| 266,036 | 8/1970 | U.S.S.R. ........................... | 323/102 |

OTHER PUBLICATIONS

Johnson et al., "Static High-Speed Var Control for Arc Furnace Flicker Reduction," Reprint vol. 34, Proceedings of American Power Conference, 1972, pp. 1101–1104, 323-124.

Khudyakov et al., "A Controlled Static Reactive Power Supply," Electric Technology USSR, Pergamon Press, vol. 1, Oct. 1969, pp. 46–48, 323-124.

*Primary Examiner*—A. D. Pellinen
*Attorney, Agent, or Firm*—J. Wesley Haubner

[57] ABSTRACT

Reactive current compensating apparatus for a multiphase electric power circuit comprises separately variable reactive impedance elements coupled to the power circuit in multiphase relation through phase shifting means such as a tertiary transformer winding. When phase voltage supplied to the compensating impedance leads or lags the line-to-neutral voltage of the power circuit the compensating effect in respect to negative phase sequence line current components is enhanced as compared to direct conductive connection of compensating impedance to the power circuit.

8 Claims, 2 Drawing Figures

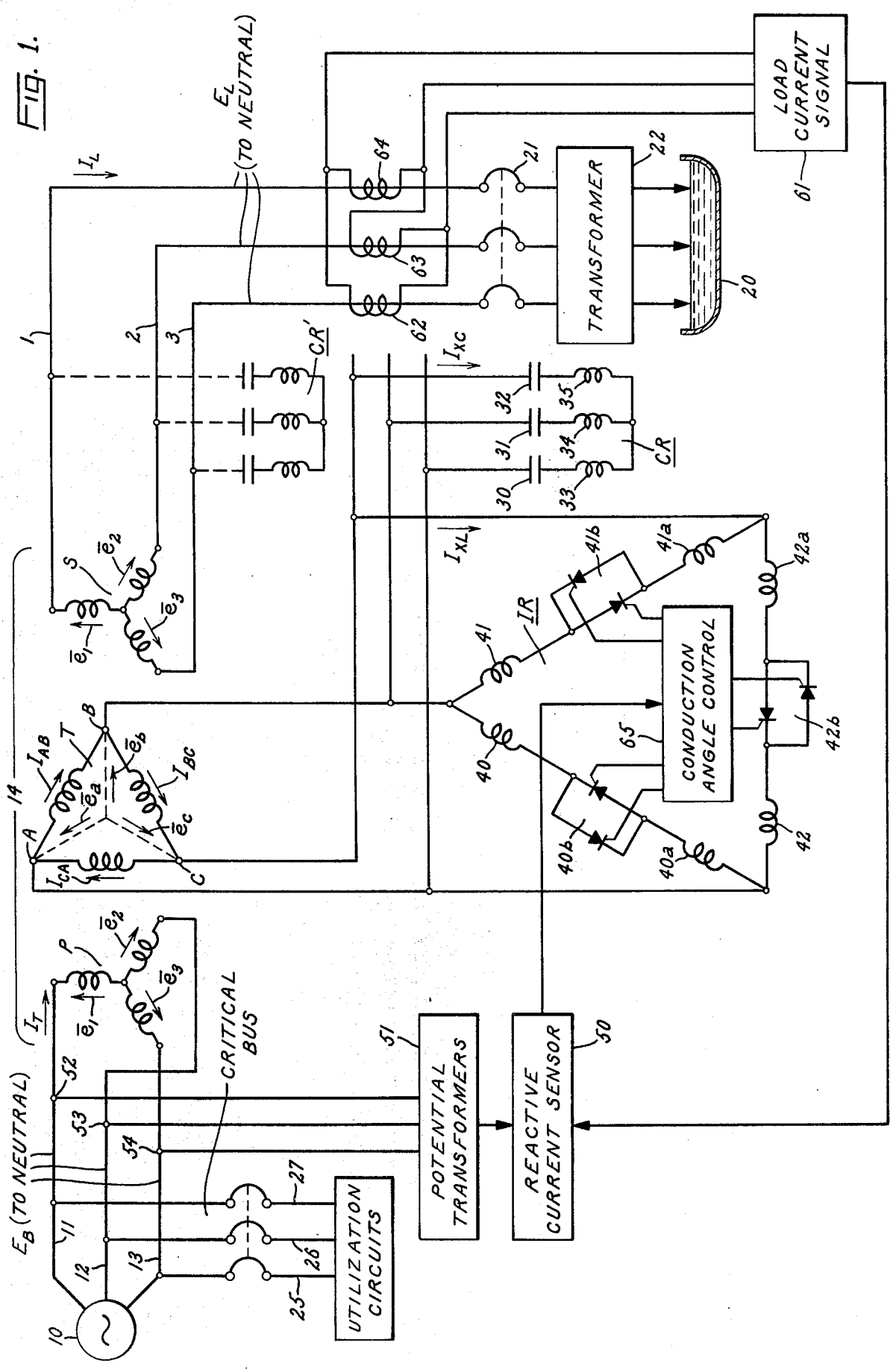

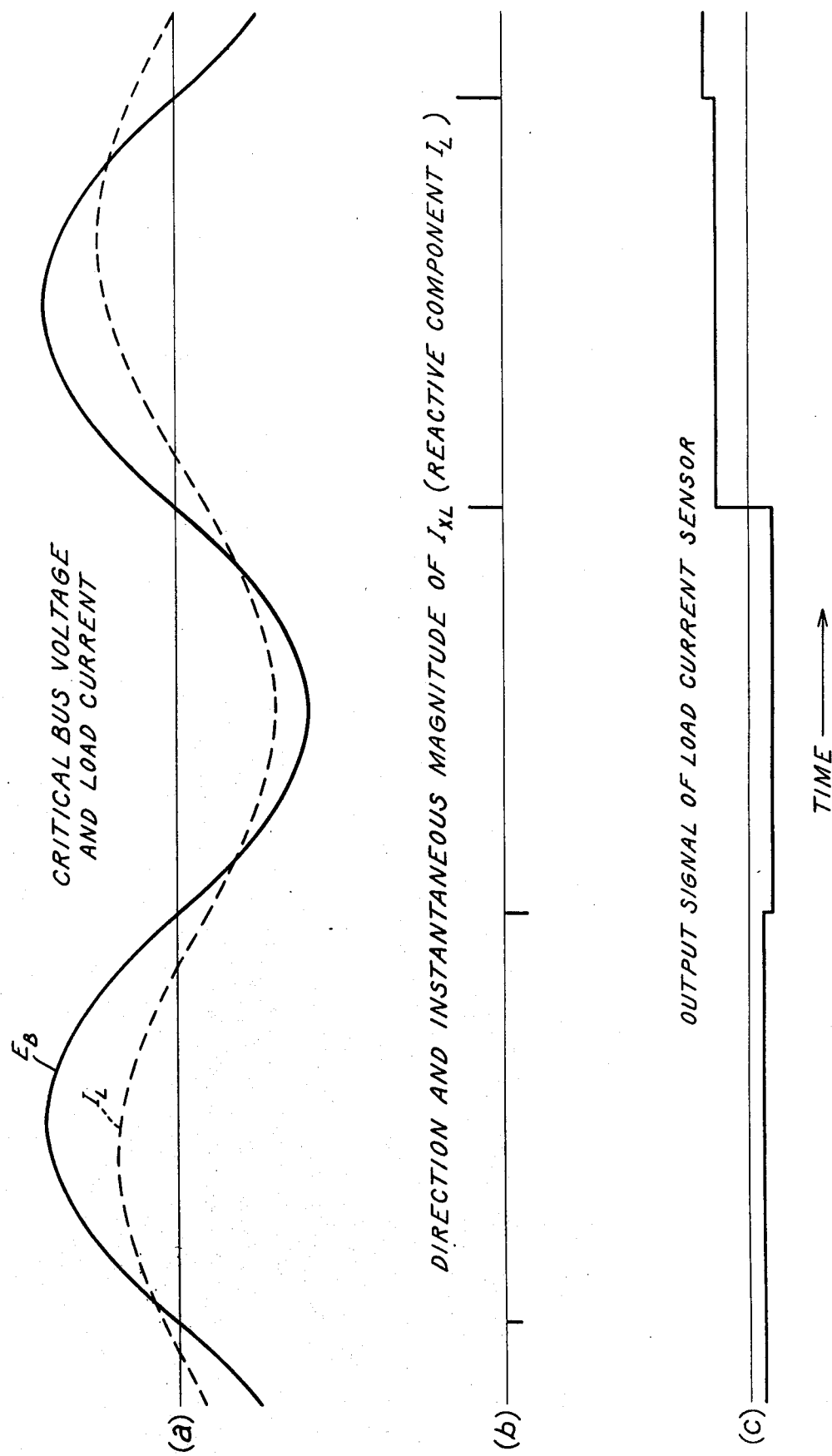

REACTIVE POWER COMPENSATOR

Our invention relates to reactive power compensating means for electric power systems. More particularly it relates to improved reactive current compensating means for supplying leading or lagging reactive current to an electric power system to stabilize voltage and improve power factor. The invention is especially applicable to power circuits subject to load current unbalance, as from the erratic operation of a large three phase electric arc furnace.

BACKGROUND

It is known that electric power systems which supply highly reactive loads are characterized by poor voltage regulation, i.e., substantial change in the magnitude of load voltage as load current increases. In a typical inductive circuit voltage magnitude and power factor both decrease as load current increases. To improve system voltage regulation power transformers are commonly provided with tap changers to counteract the tendency of voltage magnitude to change with change in load current. Since most system loads are inductive, it is known also to counteract the inductive current components of system load or of particular major loads by connecting compensating capacitance in series with or in shunt across power line conductors. Fixed capacitors may be used where the load is reasonably steady and predictable.

With certain variable and erratic major loads, such as electric arc furnaces, controllable shunt capacitance has been provided by connecting rotating synchronous condensors or static capacitors directly across the load terminals in parallel with the load. The amount of capacitance must be varied as load current changes, for fixed capacitance would have the effect on no load of increasing load terminal voltage above the applied system voltage.

Several arrangements have recently been proposed for varying the net reactive current effect of fixed shunt compensating capacitors by connecting compensating inductors in parallel with the capacitors and varying the amount of reactive current traversing the compensating inductors. This may be done by varying the magnitude of the shunt inductance across each line, as in U.S. Pat. No. 3,551,799—Koppleman, or by varying the magnitude of reactive current traversing a shunt inductor of fixed inductance. One such compensating circuit utilizing fixed capacitors and inductors in parallel with means for controlling the magnitude of inductor current is described in "Electric Technology — U.S.S.R.", Vol. 1, 1969, pgs. 46–62 (Pergamon Press, October, 1969).

By whatever means such a shunt compensating impedance is varied, it has been common practice heretofore to connect the compensating impedance directly in conductive shunt circuit relation across a power line or across the line terminals of a selected major load. We have discovered however, that by coupling the compensating impedance to the load circuit through inductive or other suitable phase shifting means the compensating impedance has an enhanced effect upon the negative phase sequence reactive components of unbalanced multiphase current. In such connection a reactive compensator acts not only to improve load power factor but also to multiply its effect in eliminating current unbalance.

SUMMARY OF THE INVENTION

Accordingly, it is a general object of our invention to provide improved means for coupling reactive current compensating means to a power circuit.

It is a more particular object of our invention to provide reactive impedance means connected to compensate for reactive components of load current in a load or power circuit and to demonstrate an enhanced effect in eliminating load current unbalance.

It is a more specific object of our invention to provide inductive coupling means for enhancing the effect of reactive impedance means in correcting current unbalance in a power supply circuit.

In carrying out our invention in one preferred embodiment we utilize phase shifting means to couple a variable compensating reactor to a power line or effectively in parallel circuit relation with a major load having an erratic reactive current demand characteristic. In a three phase circuit the variable reactor preferably comprises a three phase bank of fixed capacitors in parallel with a three phase bank of fixed inductors having a phase controlled static switch in series with the inductor in each phase. By phase control of the static switches the amount of inductive compensating current is separately controlled in each phase to counteract more or less of the capacitive compensating current in that phase. In this way the apparent inductive compensating reactance is varied thereby to control the net effective reactance of the compensating capacitors and inductors. If the fixed capacitance is greater than the fixed inductance so that the net effective reactance is always capacitive the effect is that of variable capacitance. If the fixed inductance is greater than the fixed capacitance the net effective reactance may be made inductive. In coupling this parallel combination of compensating capacitance and inductance to the load circuit we prefer to utilize phase shifting means comprising a power transformer tertiary winding which provides phase to neutral voltages shifted in the order of 20° to 50° with respect to the phase to neutral voltages of the power line, or load circuit to be compensated.

By such connection the compensating effect of a compensating reactor of predetermined volt-ampere (MVA) rating is enhanced with respect to negative phase sequence components of reactive load current, thereby more effectively to counteract such components and maintain balanced line current conditions as well as to improve power factor.

Our invention will be more fully understood and its several objects and advantages further appreciated by referring not to the following description taken in conjunction with the accompanying drawing wherein:

FIG. 1 is a schematic circuit diagram, partially in block form, of an electric power system including reactive current control means embodying my invention, and FIG. 2 is a graphical representation of certain electrical characteristics which illustrate the mode of operation of the reactive current sensor shown at FIG. 1.

DETAILED DESCRIPTION

POWER CIRCUIT COMPONENTS

Referring now to the drawing and particularly to FIG. 1, we have illustrated a three phase electric power system comprising a source of voltage illustrated as a generator 10 connected to transmission line conductors 11, 12 and 13. In a typical high voltage power system the transmission line voltage may be of the order of 115 KV or 230 KV (line to line) stepped up from the generator 10 through line transformers, now shown. Through a step down transformer 14 the transmission lines 11, 12 and 13 supply power through three load bus conductors 1, 2, and 3 to a heavy and erratically variable load illustrated as an electric arc furnace 20. The bus conductors 1, 2, 3, hereinafter referred to as the "furnace bus", may by way of example provide bus voltage of 34.5 KV (line to line). Power is supplied to the arc furnace 20 from the furnace bus through a circuit breaker 21 and a step down transformer 22. In practice the arc furnace load 20 may be made up of one or more three phase arc furnaces. Because of the erratic nature of the arcs in such a furnace load current unbalance may at times be severe.

For reasons which will be more fully described hereinafter the step-down transformer 14 between the power lines 11, 12, 13 and the furnace bus 1, 2, 3 comprises three phase wye-connected primary and secondary windings P and S, respectively, and a delta-connected tertiary winding T. For simplification of illustration all the windings are shown in vectorial voltage disposition and a transformation ratio of unity is assumed between line-to-neutral (i.e., phase) voltage of all windings. Vectorial phase voltages of the primary and secondary windings are designated $\overline{e_1}, \overline{e_2}, \overline{e_3}$. Vectorial phase voltages of the same magnitude between the tertiary winding terminals A, B, C and the virtual neutral of the delta are designated $\overline{e_a}, \overline{e_b}, \overline{e_c}$.

It will be evident therefore that the vectorial line voltages between the secondary winding terminals (i.e., between the bus conductors 1, 2, 3) are advanced by 30 electrical degrees with respect to the system of tertiary terminal voltages between the terminals A, B, C.

At a selected location on the power system intermediate the generator 10 and the substation transformer 14 a variety of other industrial, commercial and residential load circuits may be connected to the transmission line conductors 11, 12 and 13. By way of illustration such other loads have been designated as "utilization circuits" and are shown connected to the lines 11, 12 and 13 through conductors 25, 26 and 27. It is desirable that voltage upon the conductors 25, 26 and 27 should not vary appreciably in magnitude with variations in phase or magnitude of the arc furnace load current. The conductors 25, 26 and 27 therefore will be identified as the "critical voltage supply bus" upon which it is desired to minimize voltage variation due to erratic changes in current and power factor at the arc furnace 20. Line-to-neutral or phase voltage magnitude at the critical bus 25, 26, 27 is designated $E_B$ and phase voltage magnitude at the arc furnace bus 1, 2, 3 is designated $E_L$.

While it will be understood by those skilled in the art as the description proceeds that our invention is generally applicable to any system of transmission or distribution or to any unique load where it is desired to compensate, or counteract, reactive current and thus improve voltage regulation and power factor, it has particular application to an electric arc furnace load. An electric arc furnace provides a major load of such magnitude and electrical characteristic that it tends to produce substantial and erratic unbalance of load current and appreciable low frequency variation of system voltage. The invention also has particular application for compensating load variation of drag lines, rolling mill drives and long high voltage transmission lines.

The impedance of an electric arc furnace is comprised primarily of resistance and inductance and this impedance changes abruptly and erratically with changes in the melting and refining conditions in the furnace. Particularly when a new charge of metal scrap is placed in the furnace the arcs experience abrupt and appreciable physical changes over a period of at least several minutes duration until the furnace charge assumes a more or less homogeneous nature. Arcing current is determined to some extent by a counter voltage developed by the arc itself. This counter voltage is of rectangular wave shape and is in phase with the inherently lagging, or inductive, arc current. The effective impedance of the arc changes abruptly with the arc geometry and in so doing it changes phase relation with respect to the impressed load voltage. Thus to the external circuit an arc furnace load appears as a variable inductance and variable resistance. It is these characteristics which produce rapidly recurrent changes in the phase and magnitude of load voltage with respect to system voltage and consequent low frequency voltage flicker. The frequency of these voltage variations is a characteristic of the furnace parameters and may be of the order of three to six cycles per second. In a three phase arc furnace the foregoing arc characteristics also produce erratic current unbalance, particularly following recharging of the furnace.

To counteract reactive load current, and particularly inductive load current, traversing the arc furnace 20 we provide compensating impedance means magnetically coupled to the line conductors 11, 12, 13 and the load bus 1, 2, 3 through the tertiary winding T of transformer 14 and adapted to draw from the source 10 a reactive current substantially equal and opposite that drawn by the load 20. In the preferred embodiment illustrated the compensating impedance comprises a capacitive reactor CR and an inductive reactor IR connected in parallel circuit relation to the tertiary winding terminals A, B, C. The capacitive reactor CR comprises a bank of three fixed capacitors 30, 31, 32 connected in wye circuit relation through tuning inductors 33, 34, 35. In each line-to-neutral arm of the wye-connected capacitor bank the associated tuning inductor is selected to tune the capacitive reactor CR to a selected harmonic of the power system frequency, thereby to bypass current of that frequency and filter such currents from the power circuit. Preferably the capacitive reactor CR comprises three separate wye-connected banks of fixed capacitors, each bank being tuned to a different harmonic frequency, and particularly to the third, fifth and seventh harmonics of the fundamental frequency. These are the predominant harmonics generated by the furnace arcs and by phase control of thyristors in a manner to be described hereinafter. By so tuning each harmonic filter for series resonance at a selected frequency a low impedance by pass circuit is provided for that frequency so that harmonics generated in arc furnace 20 or in the thyristor-controlled switches described below do not enter the power supply circuit through the transformer 14. If additional shunt capacitance is required it is preferably tuned to harmonic frequencies above that of the seventh harmonic.

In order to control the compensating effect of the capacitive reactor CR we provide also a three phase inductive reactor IR connected to the tertiary winding terminals A, B, C in parallel circuit relation with the capacitive reactor CR. The inductive reactor IR comprises three series-connected pairs of fixed inductors 40, 40a; 41, 41a; and 42, 42a, connected in delta circuit relation, each arm of the delta including one pair of inductors in series with an intermediate alternating current thyristor switch. Specifically the inductive reactor arm 40, 40a includes an intermediate thyristor switch 40b, the arm 41, 41a includes an intermediate thyristor switch 41b and the arm 42, 42a includes an intermediate thyristor switch 42b. As is well known to those skilled in the art, each thyristor switch comprises a pair of thyristors, or a pair of thyristor groups, connected in inverse parallel relation to conduct opposite half cycles of an alternating current. In the inductive reactor IR the inductors are connected in delta relation primarily in order to minimize the current requirements of the thyristors and reactors. When the system is balanced the delta connection serves also to short circuit third harmonic currents and thus to aid in eliminating them from the power lines. The third harmonic is a predominant harmonic generated by phase controlling action of single phase thyristor switches.

In the power circuit described above the capacitive compensating reactor CR and the inductive compensating reactor IR are each coupled through the tertiary winding T effectively in shunt circuit relation with the arc furnace load 20. These reactors operate in combination to conduct a reactive compensating current opposite in phase in each line conductor to the reactive component of arc furnace load current traversing that line and effectively equal in magnitude as determined by the secondary to tertiary transformer voltage ratio (herein assumed to be 1:1). In providing a variable net amount of reactive compensating current the compensating reactors are controlled by controlling the magnitude of lagging current traversing the fixed inductors of the reactor IR, the fixed capacitors 30, 31 and 32 providing a predetermined fixed amount of leading reactive current. Phase control of inductive compensating current thus varies the apparent or effective reactance of reactor IR. It will be understood by those skilled in the art that by such control of inductive current the net reactive compensating current may be made inductive or capacitive (i.e., lagging or leading) as described.

As the description proceeds it will also become evident to those skilled in the art that if desired our invention may be utilized with variable reactive impedance elements of other design, such as variable inductors, variable capacitors or parallel banks of fixed reactors selectably and progressively switched into or out of operation. Moreover, it is possible to utilize phase controlled thyristor switches in series with fixed capacitors to control directly the magnitude of compensating capacitor current. We prefer however to utilize fixed capacitors and inductors in parallel, with phase control of inductive current as shown in the drawing and described more fully hereinafter.

It should be further noted that if desired, a fixed amount of capacitive compensation may be provided by capacitors in series with the line, or by a combination of series and parallel capacitors. The reactive current effect of a fixed capacitor in series with the line may be varied by connecting a fixed inductor in parallel with the capacitor through a phase-controlled thyristor.

In the embodiment illustrated in the drawing it is to be noted that when the thyristor switches 40b, 41b and 42b are completely non-conductive only the capacitive compensating reactor CR is in the tertiary winding circuit. When the thyristor switches are fully conductive the inductive reactor IR is fully effective to conduct a predetermined amount of lagging reactive current greater than, equal to or less than the amount of leading reactive current traversing the capacitive reactor CR. Preferably, a net amount of leading reactive current supplied through the power line 11, 12, 13 to the capacitive and inductive compensating reactors CR and IR in combination is continuously maintained approximately equal in each line conductor 11, 12, 13 to the lagging or inductive current component of furnace load current in that line under varying load conditions. When the reactive load current (normally inductive) in the power line is thus substantially balanced by an equal and opposite reactive current (normally capacitive) supplied to the combination of compensating reactors CR and IR then only the power, or resistive, component of load current appears on the power line 11, 12, 13.

We have discovered that by coupling the compensating reactors IR, CR to the furnace bus 1, 2, 3 through a phase shifting coupling means, such as the transformer tertiary winding T, any negative phase sequence components of tertiary compensating current have an enhanced, or amplified, effect in the transformer secondary or output winding. For this reason load current unbalance (i.e., due to negative phase sequence components of load current) may be compensated more effectively when the compensating reactor is coupled to the load circuit through a voltage phase shift device than when conductively connected directly in parallel with the load. For a load of any predetermined MVA rating this enhanced effect with respect to negative phase sequence (i.e., unbalancing) current components permits use of a compensating reactor of less MVA rating than would be required in direct conductive connection to the load. This is due to the fact that in the case of loads subject to severe unbalance the required compensator rating is determined by the negative phase sequence compensating requirements.

COMPENSATING CURRENT CONTROL

In order to control the amount of inductive current traversing the compensating reactor IR we provide a Conduction Angle Control 65 illustrated generally in block form at FIG. 1. This Conduction Angle Control is responsive without appreciable time delay to signals proportional to the reactive component of load current and operates to establish and continuously reset the gating angle of the thyristor switches 40b, 41b, and 42b, thereby to maintain the net reactive current traversing the compensating reactors IR and CR substantially equal in magnitude and opposite in phase to the reactive component of load current as viewed at the Critical Bus.

By "gating angle" we mean the phase angle with respect to the impressed alternating voltage wave at which each thyristor is triggered into conduction. This phase angle, as measured from the start of forward voltage impressed on the thyristor, is referred to hereinafter as the "gating angle". The interval during which the thyristor subsequently conducts following each triggering is referred to hereinafter as the "conduction angle". When the conduction angle is substantially 180° for each thyristor the switch is considered to be fully "on" or closed; when the conduction angle is substantially 0° the switch is considered to be fully "off" or open. At intermediate conduction angles, and correspondingly intermediate gating angles, the switch is partially "on" and partially "off" during each half cycle and controls the amount of current flowing therethrough by the ratio of "on time" to "off time".

Direct reactive current control acts without feedback, so that undesired bias or drift could introduce error into the compensation setting. It may be desirable therefore to additionally include means responsive to power factor, or current angle, at the critical voltage bus 25, 26, 27 to provide a second conduction angle control signal such that power factor at the critical bus is maintained substantially constant, preferably near unity. Such current angle control provides negative feed-back through the line current and voltage sensors required, and is thus a regulating control as distinguished from an open-ended compensating control. When used in combination with direct reactive current control a current angle control should be provided with suitable time delay so that it serves as an adjustment to prevent drift or other error in the direct reactive current control. Such combined control of reactive compensating current is no part of our present invention but is described and claimed in a copending application Ser. No. 406,139 filed on Oct. 12, 1973 by F. W. Kelley, Jr., and G. R. E. Lezan and assigned to the same assignee as the present application. In order to simplify the illustration of our present invention current angle control is not included on the drawing nor further described herein.

The direct compensating current control illustrated at FIG. 1 and 2, comprises a Reactive Current Sensor 50 receiving input signals responsive to load current and to phase voltage at the critical bus. The Reactive Current Sensor operates in a manner illustrated at FIG. 2 to develop a variable unidirectional, or unipolarity, output signal which controls the gating angle of the trigger signals thereby periodically to fire, or turn on, the thyristor switches 40b, 41b, 42b, for each instantaneous compensation requirement. In referring to a "unidirectional" or "unipolarity" output signal we mean a signal having a single direction, or polarity, for any predetermined reactive current condition to be corrected, the signal direction or polarity indicating whether that reactive current is leading or lagging with respect to voltage. Thus while the signal polarity may reverse from time to time as power circuit impedance changes it is unidirectional, or unipolar, for any one impedance condition of the power circuit.

Phase voltage signals supplied to the Reactive Current Sensor 50 are derived from the power lines 11, 12, 13 through potential transformers 51 connected to the lines, 11, 12, 13 at points 52, 53 and 54, respectively, adjacent the critical bus. In the Reactive Current Sensor 50 each phase voltage signal ($E_B$) cooperates with a load current signal ($I_L$) in a manner illustrated at FIG. 2 to generate a signal output during each half cycle of phase voltage $E_B$ which is representative of the character and magnitude of the reactive current component in the load circuit 20. It will be understood that three such reactive current signals are derived, one for each line of the three phase power circuit.

In FIG. 2 we have shown at diagram (a) in solid lines the phase voltage signal $E_B$ for one phase as supplied to the Reactive Current Sensor 50. Also on diagram (a) there appears in dotted lines a load current signal $I_L$ from the associated load conductor supplied to the Current Sensor 50 through a load current signal source 61 from one of a group of load current transformers 62, 63, 64. For the purpose of illustrating the mode of operation of the Reactive Current Sensor the current signal $I_L$ illustrated at FIG. 2(a) is shown as varying in phase with respect to the phase voltage signal $E_B$ from an initial leading relation to a final lagging relation. The Reactive Current Sensor 50 includes suitable circuit means (not shown) for instantaneously sampling the magnitude and direction of the current signal $I_L$ at each zero crossing point of the phase voltage signal $E_B$. These current signal samples are shown at FIG. 2(b). Finally, as shown at FIG. 2(c), the Reactive Current Sensor 50 includes signal storage means for developing a continuous unidirectional signal output having a magnitude and direction proportional to the magnitude and direction of the last previous instantaneous sampling indicated at FIG. 2(b). Thus the signal output of the Reactive Current Sensor is an instantaneously unidirectional signal for each phase having a magnitude representative of the magnitude of reactive load current in that phase at any moment and a polarity indicative of the leading or lagging character of that load current. It will of course be understood by those skilled in the art that an instantaneous sampling of load current magnitude at the instant of phase voltage zero is a direct measure of the magnitude of the reactive component of that current with respect to the sampling voltage.

The output signals from the Reactive Current Sensor 50, the signal for each phase being reset each half cycle at the zero crossing of phase voltage at the critical bus, represent in polarity and magnitude, respectively, the phase relation and magnitude of the net reactive current required to be conducted at any instant by the compensating reactors CR and IR in order to bring total line current $I_T$ into phase with the critical bus voltage $E_B$ then existing. The leading reactive currents ($I_{XC}$) through compensating reactor CR being fixed, adjustment to the desired value is carried out by controlling the average magnitude of the lagging reactive currents ($I_{XL}$) traversing compensating reactor IR. The currents $I_{XL}$ are determined in magnitude by the gating angles of the thyristor switches 40b, 41b, 42b. The thyristor gating angles determined by the Current Sensor 50 are so adjusted and reset on an instantaneous basis that the total reactive currents ($I_{A-B}$, $I_{B-C}$, $I_{C-A}$) appearing in the tertiary transformers windings require primary winding reactive currents effectively substantially equal to and opposite to the reactive components of load current $I_L$ supplied to the arc furnace 20, from the power transformer secondary winding. It will of course be understood by those skilled in the art that if the primary to secondary transformer voltage ratio is other than 1:1 as here assumed for simplicity, "effective" equality of primary and secondary reactive currents will not be numerical identity; for any transformer voltage ratio "effective" equality of primary and secondary currents or current components occurs when the ratio of such currents is the inverse of the primary to secondary winding voltage ratio.

To so control the gating angles of the thyristor switches the three reactive current signals from the Current Sensor 50 are supplied to a Conduction Angle Control 65 which includes a separate conduction angle control circuit for each thyristor switch, each such angle control circuit being responsive to the three reactive current signals. Each angle control circuit in the Conduction Angle Control 65 may be of the type described and claimed in U.S. Pat. No. 3,693,069 issued on Sept. 19, 1972 to F. W. Kelley, Jr. and G. R. E. Lezan. The conduction angle control illustrated in U.S. Pat. No. 3,693,069, when used in conjunction with a highly inductive power circuit, exhibits some non-linearity in thyristor output current with respect to the input signal and a dynamic response which may result in an underdamped tendency to overshoot. Preferably therefore we utilize a conduction angle control of the type described in a U.S. patent application Ser. No. 503,143 filed on Sept. 3, 1974 by Fred W. Kelley, Jr. and assigned to the same assignee as the present application.

It will now be understood by those skilled in the art that when the gating angles of the thyristor switches 40b, 41b, 42b are set in accordance with the output signals of the Reactive Current Sensor 50 the reactive compensating currents $I_{A-B}$, $I_{B-C}$ and $I_{C-A}$ supplying the compensating reactors IR and CR will draw from the source 10 reactive currents effectively substantially equal and opposite to the reactive currents required by the arc furnace load 20 and the substation transformer 14, so that total line current $I_T$ is maintained substantially in phase with line voltage $E_b$ at the critical bus 25, 26, 27.

It is to be understood that, while at FIG. 2 load current has been shown for illustration as leading the voltage signal $E_B$ at one point, this is an unusual condition. The reactive components of current required by both the arc furnace 20 and transformer 14 are in fact inductive so that the net reactive compensating current supplied to the compensating reactors IR and CR ordinarily will be capacitive. It is for this reason that the capacitive reactance of the fixed capacitors 30, 31, 32 is ordinarily greater than the inductive reactance of the reactors 40, 40a, 41, 41a, 42, 42a. Thus when the thyristor switches 40b, 41b, 42b are fully conducting (i.e., apparent inductive reactance minimum so that inductive compensating current in reactor IR is maximum) such current is ordinarily at least slightly less than the capacitive compensating current traversing the reactor CR.

It should be noted that it is possible for the reactive component of load current in at least one line to be leading, as in an arc-out condition in one phase of an arc furnace. For full compensation of such a condition the reactor IR must be able to supply lagging currents of greater magnitude than the fixed leading currents in reactor CR.

It will be evident to those skilled in the art that, while we have shown at FIG. 2 only the single phase voltage and the load current in one line, the three phase circuit illustrated at FIG. 1 involved three such relationships and it is contemplated that three reactive load current signals [FIG. 2(c)] will be generated. These three current signals will be equal in a balanced circuit, but will be different at any instant in the case of an unbalanced load. In the case of unbalance, therefore, it will be understood that in any one half cycle the resulting gating angles are not the same in the several switches 40b, 41b, 42b. It is evident of course that by the control described these gating angles are reset each half cycle in accordance with existing load current conditions.

MODE OF OPERATION

In the copending U.S. patent application Ser. No. 406,139 referred to above it is disclosed that, in a power circuit where reactors CR and IR are conductively connected directly in parallel with the load 20 across the furnace bus 1, 2, 3, full compensation of reactive load current in each line of a three phase power circuit will be provided when the net compensating reactance between each pair of bus conductors (i.e., the net line to line reactance of IR and CR), expressed in terms of the reactive components of load current, is as follows:

$$X_{c(1-2)} = \frac{3E_L}{-I_{3LX} + I_{1LX} + I_{2LX}}$$

$$X_{c(2-3)} = \frac{3E_L}{-I_{1LX} + I_{2LX} + I_{3LX}}$$

$$X_{c(3-1)} = \frac{3E_L}{-I_{2LX} + I_{3LX} + I_{1LX}}$$

where $E_L$ is the peak magnitude of line-to-neutral voltage at the load, $X_c$ is net capacitive compensating reactance between the indicated pairs of line conductors (1-2-3) and $I_{1LX}$, $I_{2LX}$ and $I_{3LX}$ are lagging reactive compounds of load current in the respective load circuit conductors. It will of course be evident that if solution of these equations in any case results a negative "$X_c$" the indication is that net compensating reactance should be inductive rather than capacitive.

From the foregoing relations it may be determined that in the direct conductive connection of compensating reactors the reactive current ($I_{xc}$) traversing the compensating reactors, as between the furnace bus conductors 1-2, may be represented, in terms of peak magnitude of reactive load circuit current, as follows:

$$I_{xc(1-2)} = \frac{\sqrt{3} E_L}{X_{c(1-2)}} = \sqrt{3} \left[ (\tfrac{1}{3} I_{1LX}) + \tfrac{1}{3} (I_{2LX} - I_{3LX}) \right].$$

To illustrate by comparison the effect of our invention utilizing phase shifted coupling of the compensating reactors, we find that in the circuit shown at FIG. 1 (i.e., 30° phase shift) the reactive current $I_{xc(A-B)}$ traversing the compensating reactors connected across the tertiary winding terminals A and B may be represented, in terms of reactive load current components as follows:

$$I_{xc(A-B)} = \frac{\sqrt{3} E_L}{X_{c(A-B)}} = \sqrt{3} \left[ (\tfrac{1}{3} I_{2LX}) + \tfrac{1}{3}(\tfrac{2}{3} I_{2LX} - \tfrac{1}{3} I_{3LX} - \tfrac{1}{3} I_{LX}) \right]$$

It will be apparent to those skilled in the art that in the foregoing equations for compensating current the first parenthetical term in the major brackets represents positive phase sequence reactive load current compensation while the second parenthetical term represents negative phase sequence reactive load current compensation. By comparison of the equations it will be evident that in the case of phase shift coupling any predetermined reactive load current will be fully compensated with a smaller negative phase sequence component of compensating current in the compensating reactor than would be required for direct parallel connection of the reactor across the load. It is therefore possible to obtain full compensation in the phase shifted mode with a compensating reactor of greater impedance and smaller MVA rating.

We have discovered that, when a compensating reactor having inductive elements such as IR and capacitive elements CR is controlled by means of only one of these elements, as by controlling IR in the manner illustrated at FIG. 1, the advantage of our phase shifted connection may be attained even though all or part of the fixed compensating elements are connected directly in parallel with the load across the load terminals (i.e., without phase shift). It is sufficient that only the controlled reactor elements be coupled to the load through suitable phase shifting means. At FIG. 1 we have illustrated such an alternative connection by showing fixed capacitive compensating elements CR' optionally connected to the load bus 1, 2, 3 by broken lines. The capacitive reactor CR' may comprise all or part of the capacitive compensation, as desired. In this manner it is possible to reduce the MVA rating of the phase shifting means. It will of course be understood that if the capacitive compensating elements are controlled, as by phase controlled static switches, and the inductive compensating elements are not controlled, than all or part of the inductive compensating elements may be connected directly to the load bus.

At FIG. 1 and in the foregoing specific description we have illustrated a preferred embodiment of our invention wherein the compensating reactor assembly CR, IR is coupled to the power circuit through a delta connected tertiary winding T on a transformer 14 having wye connected secondary winding. By this means the phase voltages and terminal voltages in the tertiary winding circuit are displaced by 30 electrical degrees from the secondary winding phase voltages and line voltages, respectively. In the connection illustrated the tertiary phase voltages $\overline{e}_a$, $\overline{e}_b$, $\overline{e}_c$ are advanced by 30° with respect to the secondary winding phase voltages $\overline{e}_1$, $\overline{e}_2$, $\overline{e}_3$, respectively. We have discovered that a similar enhanced compensating action in respect to negative phase sequence components of reactive load current may be attained by so connecting the tertiary windings that the tertiary phase and terminal voltages lag the secondary phase and line voltages 30 electrical degrees. Moreover, in utilizing a tertiary transformer winding to accomplish the voltage phase shift herein described the several transformer windings may be connected in a variety of other modes so long as a leading or lagging phase displacement exists between line voltage at the load circuit to be compensated and terminal voltage in the compensating circuit. For example, if the secondary windings are delta connected, the tertiary winding may be wye connected. It is to be noted that the desired phase shift is between terminal voltages in the compensating circuit and line voltages in the circuit to be compensated, as between the transformer secondary and tertiary windings in the case illustrated. Phase shift with respect to the primary or input conductors 11, 12, 13 is not essential, so that in the example of FIG. 1 the primary winding and tertiary winding could both be delta connected so long as the secondary transformer winding is wye connected, or the like. Moreover, by employing zig-zag winding connections in one or more of the windings phase advance or phase retard angles of more or less than 30° may be attained.

It will be apparent to those skilled in the art that, if desired, phase shifting coupling means other than a tertiary transformer winding may be employed. For example rotary transformers or various phase shifting impedance networks may be used so long as each phase of the compensator is separately controllable.

As suggested above, our invention is not limited to the use of a phase shift in the amount of 30°, nor is it limited to use with loads having the unique electrical characteristics of an arc furnace. While the effect of phase shift other than 30° is not yet fully understood it is considered probable that the voltage phase shift described above will be effective to enhance the negative phase sequence effect of reactive current compensation at least in a range of about 20° to 50° lead or lag with respect to supply line voltage. Moreover, it is believed that this enhancing action is most effective in compensation of electrical loads having substantial inductive impedance.

While we have illustrated a preferred embodiment of our invention by way of illustration, many modifications will occur to those skilled in the art, and we therefore wish to have it understood that we intend in the appended claims to cover all such modifications as fall within the true spirit and scope of our invention.

What we claim as new and desire to secure by Letters Patent in the United States is:

1. Reactive current compensating apparatus for a multiphase alternating current electric power circuit having load terminals and load conductors and subject to varying reactive current demand at said load terminals comprising, a multiphase compensating reactor of controllable effective reactance, phase shifting means for coupling said compensating reactor to said load conductors effectively in shunt circuit relation across said load terminals, said phase shifting means supplying to said reactor a multiphase system of terminal voltages displaced in phase with respect to the line voltages at said load conductors, means for generating signals proportional in each phase to the reactive component of current traversing each phase of a reactive multiphase electrical load connected to said load terminals, and means responsive to said signals for maintaining the net effective reactance of each phase of said compensating reactor effectively substantially equal and opposite to the reactance of the associated phase of said electrical load.

2. Reactive current compensating apparatus according to claim 1 wherein said coupling means comprises a transformer having primary and secondary windings connected respectively to said supply conductors and to said load conductors and including a tertiary winding, said compensating reactor being connected to said tertiary winding.

3. Reactive current compensating apparatus according to claim 1 wherein said compensating reactor includes fixed reactor elements connected directly to said load terminals.

4. Reactive current compensating apparatus for a three phase electric power circuit according to claim 2 wherein said secondary windings are wye connected and said tertiary winding is delta connected, whereby the tertiary winding terminal voltages are displaced by 30 electrical degrees from the secondary winding line voltages.

5. Reactive current compensating apparatus according to claim 2 wherein said tertiary winding provides to said compensating reactor a multiphase system of terminal voltages displaced in phase with respect to the multiphase voltages at said load terminals within the range of approximately 50 electrical degrees advanced to 50 electrical degrees retarded.

6. Reactive current compensating apparatus for a three phase electric power circuit according to claim 1 wherein said compensating reactor comprises at least one three phase group of fixed capacitors connected in wye circuit relation, a three phase group of fixed inductors and alternating current static switches connecting said inductors in delta circuit relation, one said inductor and static switch being connected in series circuit relation between each delta terminal, each said static switch including gating means for varying the conduction angle thereof thereby to control the magnitude of reactive current traversing the associated inductor, said signal responsive means being connected to control said gating means.

7. Reactive current compensating apparatus according to claim 6 wherein at least one said three phase group of fixed capacitors is connected directly to said load terminals.

8. Reactive current compensating apparatus for a multiphase alternating current electric power circuit having load terminals and load conductors and subject to varying reactive current demand at said load terminals comprising, a multiphase compensating reactor including fixed capacitors and fixed inductors connected in multiphase parallel circuit relation, phase shifting inductive coupling means connecting said compensating reactor to said supply conductors effectively in shunt circuit relation across said load conductors, said phase shifting means supplying to said reactor a multiphase system of terminal voltages displaced in phase with respect to the line voltages at said load conductor, alternating current static switching means connected directly in series with each said inductor, said static switching means inlcuding gating means for varying the conduction angle of said switching means thereby separately to control the magnitude of reactive current traversing each said inductor, means for generating signals representative in each half cycle of power circuit frequency of the reactive components of current traversing each phase of a reactive multiphase electrical load connected between said load terminals, and means responsive to said signals for controlling said gating means to maintain the net effective reactance of each phase of said compensating reactor effectively substantially equal and opposite to the reactance of the associated phase of said electrical load.

* * * * *